United States Patent [19]

Ishimatsu

[11] Patent Number: 4,723,451
[45] Date of Patent: Feb. 9, 1988

[54] POWER TAKE-OFF DEVICE OF PRIME MOVER FOR PROPELLING WATERCRAFT

[75] Inventor: Tsutomu Ishimatsu, Akashi, Japan

[73] Assignee: Kawasaki Jukogyo Kabushiki Kaisha, Japan

[21] Appl. No.: 865,446

[22] Filed: May 21, 1986

[30] Foreign Application Priority Data

May 29, 1985 [JP] Japan .............................. 60-117534

[51] Int. Cl.$^4$ ..................... F16H 37/00; B63B 35/00; B63H 11/113
[52] U.S. Cl. ................................... 74/15.69; 114/270; 114/344; 180/198; 403/361; 403/383; 415/121 R; 416/146 R
[58] Field of Search ................... 74/15.69, 15.63, 13; 114/270, 344; 180/198; 403/361, 383; 415/121 R; 416/146 R

[56] References Cited

U.S. PATENT DOCUMENTS

| | | |
|---|---|---|
| 523,506 | 7/1894 | Barnes ............................. 403/383 X |
| 1,362,243 | 12/1920 | Ellis ....................................... 74/13 |
| 1,464,336 | 8/1923 | Polansky ..................... 416/146 R X |
| 1,663,253 | 3/1928 | Hillborn ...................... 415/121 R X |
| 2,250,070 | 7/1941 | Simmons ............................ 180/198 |
| 2,477,681 | 8/1949 | Anderson ................... 415/121 R X |
| 2,869,907 | 1/1959 | Deliso .............................. 403/361 X |
| 2,960,056 | 11/1960 | Puccinelli ....................... 114/344 X |
| 3,085,543 | 4/1963 | Falkner ......................... 74/15.63 X |
| 3,194,335 | 7/1965 | Yue ................................. 180/291 X |
| 3,813,190 | 5/1974 | Keating ..................... 415/121 R X |
| 3,859,785 | 1/1975 | Leto et al. ................. 416/146 R X |
| 4,568,293 | 2/1986 | Yazaki ............................. 114/270 X |

Primary Examiner—Allan D. Herrmann

[57] ABSTRACT

A power take-off device for employing the power of a prime mover originally provided for propelling a watercraft to drive equipment other than the watercraft. The stern-side end of an impeller shaft rotated by the prime mover for propulsion is extended outward beyond the impeller to be exposed in view. This extended portion provides a coupling engaging removably with an input coupling to a drive gear on aforesaid equipment.

7 Claims, 4 Drawing Figures

POWER TAKE-OFF DEVICE OF PRIME MOVER FOR PROPELLING WATERCRAFT

FIELD OF THE INVENTION AND RELATED ART STATEMENT

This invention relates to a power take-off device of a prime mover for propelling a watercraft for employing the power of the prime mover to equipment rather than the watercraft.

In the conventional prime mover-loaded watercraft for surface water recreation, the driving force of the mover mostly has been used only for propelling the watercraft, ranging from low-speed watercrafts propelled by screw to high-speed watercrafts driven by water jet.

But, it is more preferable that the power of the mover on the small watercraft could be utilized for various kinds of applications which are growing as nowadays recreations on the shore have been diversified and become luxurious and people have tended to make a longer stay. With the construction of the conventional driving portion on a watercraft unchanged, it was difficult to apply the mover power to other uses than the propulsion of the watercraft.

OBJECT AND SUMMARY OF THE INVENTION

In view of the above problems in the related art, it is the object and purpose of the invention to provide a power take-off device allowing the power of the prime mover on a watercraft to be utilized for other purpose than the propulsion of the watercraft.

To achieve aforesaid object, a power take-off device adapted for a watercraft according to the invention comprises the stern side of an impeller shaft, which is driven by the prime mover on a watercraft, being extended outward beyond the impeller so as to be exposed in view, and, on aforesaid extended portion of the impeller shaft, a shaft coupling being provided to engage removably with the input coupling to the driving gear for various equipment separate from aforesaid watercraft.

Aforesaid means according to the invention also enables the driving force of the prime mover installed on a watercraft to be transmitted through the impeller shaft to the shaft coupling in order to drive the driving gear of various equipment in addition to propelling the watercraft itself.

BRIEF DESCRIPTION OF THE DRAWING

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENT

Figure 1:
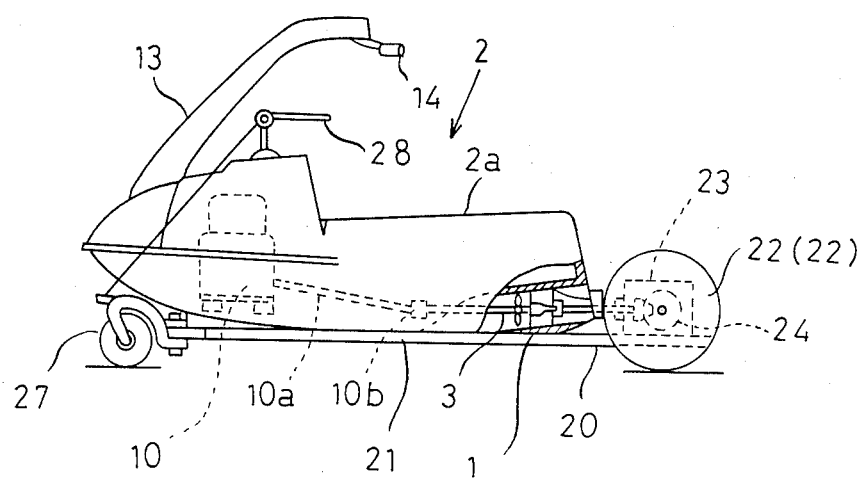
FIG. 1 is a partially cutaway side view showing an embodiment of a power take-off device on a watercraft according to the invention together with a three-wheeled cart for carrying the watercraft on board.

Referring to the drawings, the following is the description of an embodiment of a power take-off device adapted for a watercraft according to the invention, along with a three-wheeled cart for carrying the watercraft on board.

Figure 2:
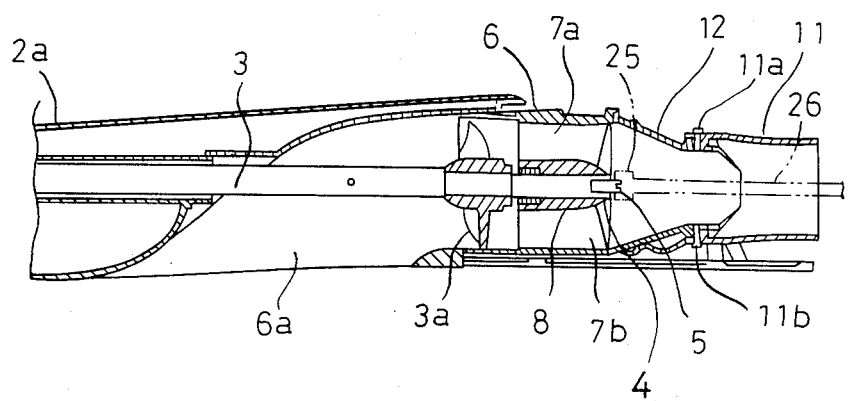
FIG. 2 is a grossly enlarged sectional view showing the major parts of the embodiment.
Figure 3:
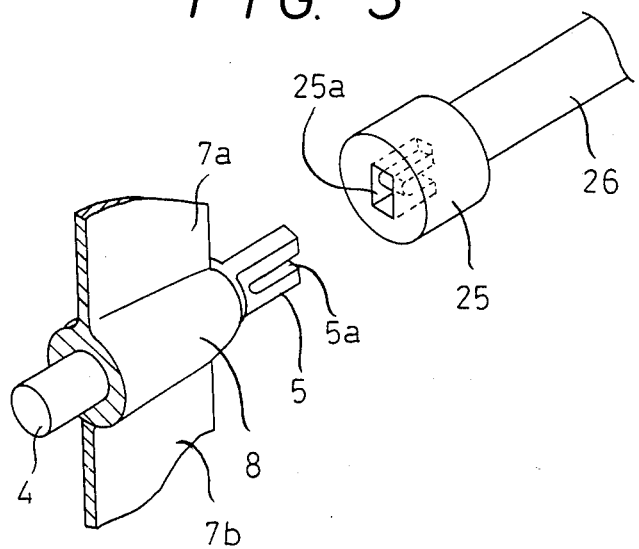
FIG. 3 is an enlarged perspective view showing the major parts particularly with respect to a coupling of the power take-off device of the embodiment and a separate coupling of a driving gear on equipment.

As shown in FIGS. 1 and 2, a power take-off device 1 according to the invention is provided on the stern side of an impeller shaft 3 in a water jet driven watercraft 2, and it consists of an extending portion 4 on the stern side of the impeller shaft 3 rotatably supported by a hub 8 held on the center of a duct 6 through stays 7a and 7b vertically crossing the duct 6 or the path for the jet stream, and a flat key-shaped coupling 5 formed on the portion exposed from the hub 8 in the extending portion 4, as shown in FIG. 3.

This watercraft is designed to drive the impeller shaft 3 by a prime mover 10 consisting of a water-cooled engine disposed on the front portion of a hull 2a made of synthetic resin or other like, through its output shaft 10a and a universal joint 10b, to rotate an impeller 3a fixed to the impeller shaft 3 right in front of aforesaid hub 8, and to generate jet stream by sucking the water from an intake 6a and guide the jet stream through the duct 6 to a nozzle 11 for propulsion and steerage. The nozzle 11 is pivoted on a casing 12 by stems 11a and 11b so as to swing to left and right, and interlocks through steering cable (not shown) with a handle bar 14 held on the upper free-end portion of a handle pole 13 disposed on the bow portion for ship's left and right horizontal swing motion.

As shown in FIG. 3, a U-shaped notch 5a can be provided in aforesaid flat-key-shaped coupling 5 at its center to secure the rotational drive engagement with a mating coupling 25 attached to equipment 20 (shown only in FIG. 1).

In this embodiment, a three-wheeled cart, carrying the water jet driven watercraft 2 on board at the shore, is taken as the equipment 20 which should be driven by the prime mover 10 on aforesaid watercraft 2 and so should have a power transmission 23 to rotate two rear wheels 22 and 22. This power transmission 23 consists of a differential gear 24 disposed on the back of a base 21 of the cart in its center line, and an intermediate input shaft 26. The differential gear 24 has an identical construction to that used in the car, and is provided with the turning force through the coupling 5 of the power take-off device 1 on the watercraft loaded on the base 21, and through the intermediate shaft 26 with the coupling 25 engaged, passing through the nozzle 11, to drive the rear wheels 22 and 22. The steering of the cart is made by swinging to right or left a front wheel 27 via wire rope using a handle 28 of simple construction provided on the watercraft 2, but may also be alternatively controlled by engaging or disengaging respective clutches provided on the right and left drive shafts for the rear wheels 22 and 22. The coupling 25 on the power transmission 23 side of the cart has a recess 25a to receive the flat-key shape coupling 5.

Figure 4:
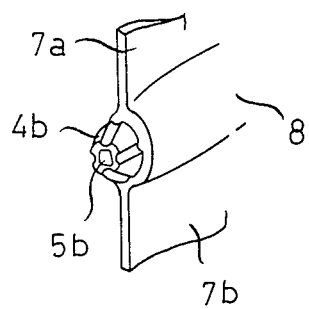
FIG. 4 is a perspective view showing the major parts exemplifying another coupling of the power take-off device.

Rather than the flat-key-shape coupling, the couplings on the power take-off device side and the equipment side can take such a shape as that for a power take-off device side shown in FIG. 4, that means; on one side, a square hole 5b is provided in the center of one coupling end with an irregular exposed portion 4b of a conical shape, and on the other side, a square projection mating into the square hole 5b is formed on the center of the other coupling end with a corresponding irregular inner portion. Spline-type couplings can also be adopted for this connection.

In addition to aforesaid three-wheeled cart, a grinder, winch, portable generator or other working devices can be also supplied with the power of a prime mover of a watercraft.

As described above, according to the invention, power of a prime mover installed on a watercraft can be taken out for a turning force actuating a drive gear on various types of equipment through the impeller shaft, in addition to being used for the watercraft itself, which will realize a multi-functional use of the prime mover for propelling a watercraft as well as for enjoying diversified recreations.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A power take-off device for transmitting power of a prime mover for driving an impeller for propelling a watercraft to a drive gear for various equipment separate from said watercraft, said prime mover being stationarily mounted inboard of said watercraft, comprising:

an extended portion on a stern side of a shaft of said impeller extended outward beyond said impeller so as to be exposed in view; and a shaft coupling provided on said extended portion of said impeller shaft to engage removably with an imput coupling to said drive gear for various equipment.

2. A power take-off device as claimed in claim 1, wherein said exposed extended portion of said shaft of said impeller has a substantially conical shape.

3. The power take-off device defined in claim 2 wherein said conically shaped exposed portion includes a square hole defined therein and has indentations in the surface thereof to make that surface irregular.

4. A power take-off device for transmitting power from a prime mover which drives an impeller of a watercraft for powering various pieces of equipment which are separate from the watercraft the impeller being mounted on the stern portion of a hull of the watercraft and the prime mover being stationarily mounted in board the watercraft at a forward location, comprising:

an impeller shaft extending longitudinally and rearwardly along the watercraft from the prime mover and having a forward end thereof connected to the prime mover to be driven thereby and having a stern end thereof connected to the impeller;

a duct mounted on the hull stern portion adjacent to and downstream of the impeller;

a flow passage in said duct through which water from the impeller flows to be discharged rearwardly from the watercraft;

an impeller extension mounted in said duct to extend longitudinally of said duct, said extension being located on said impeller stern end, said impeller shaft and said impeller extension being monolithic so that said impeller shaft and said impeller extension form a one-piece shaft unit, said impeller extension having a stern end which forms the rearwardmost end of said one-piece shaft unit; and coupling means on said one-piece shaft unit rearwardmost end for releasably engaging an imput coupling of one of the various pieces of equipment.

5. The power take-off device defined in claim 4 further including stay means extending across said flow passage and mounting said impeller extension to said duct.

6. The power take-off device defined in claim 4 further including a nozzle movably connected to said duct.

7. The power take-off device defined in claim 4 wherein said equipment input shaft includes a slotted coupling and said one-piece shaft coupling means includes a key member adapted to releasably engage said slotted coupling.

* * * * *